(12) United States Patent
Jin et al.

(10) Patent No.: US 7,650,047 B2
(45) Date of Patent: Jan. 19, 2010

(54) CHANGE DETECTION EQUIPMENT AND METHOD OF IMAGE RECOGNITION

(75) Inventors: Haomin Jin, Dalian (CN); Kazuaki Iwamura, Nishitokyo (JP); Takashi Hino, Yokohama (JP)

(73) Assignee: Hitachi Software Engineering Co., Ltd., Kanagawa (JP)

( * ) Notice: Subject to any disclaimer, the term of this patent is extended or adjusted under 35 U.S.C. 154(b) by 833 days.

(21) Appl. No.: 11/041,438

(22) Filed: Jan. 25, 2005

(65) Prior Publication Data

US 2006/0045351 A1    Mar. 2, 2006

(30) Foreign Application Priority Data

Aug. 25, 2004    (JP) .............................. 2004-244545

(51) Int. Cl.
*G06K 9/68* (2006.01)

(52) U.S. Cl. ...................................... 382/294; 382/218

(58) Field of Classification Search ................. 382/218, 382/294
See application file for complete search history.

(56) References Cited

U.S. PATENT DOCUMENTS

| 4,783,831 | A | * | 11/1988 | Kashioka et al. ............ 382/218 |
| 5,751,854 | A | * | 5/1998 | Saitoh et al. ................ 382/218 |
| 2002/0044691 | A1 | * | 4/2002 | Matsugu ..................... 382/218 |
| 2002/0051572 | A1 | * | 5/2002 | Matsumoto et al. ......... 382/190 |
| 2002/0196423 | A1 | | 12/2002 | Shima |
| 2004/0263514 | A1 | | 12/2004 | Jin et al. |

FOREIGN PATENT DOCUMENTS

| EP | 0 311 991 | 4/1989 |
| JP | 10-214348 | 8/1998 |
| JP | 2000-310940 | 11/2000 |

* cited by examiner

*Primary Examiner*—Charles Kim
*Assistant Examiner*—Stephen R Koziol
(74) *Attorney, Agent, or Firm*—Antonelli, Terry, Stout & Kraus, LLP.

(57) ABSTRACT

The present invention can extract a change not only from an orthorectified image but also from a plurality of images captured at different camera positions, under different lighting conditions, at different angles, and at different scaling factors. Foot-print information is extracted from each of images to be compared, and a change is detected by comparing the foot-print information.

22 Claims, 6 Drawing Sheets

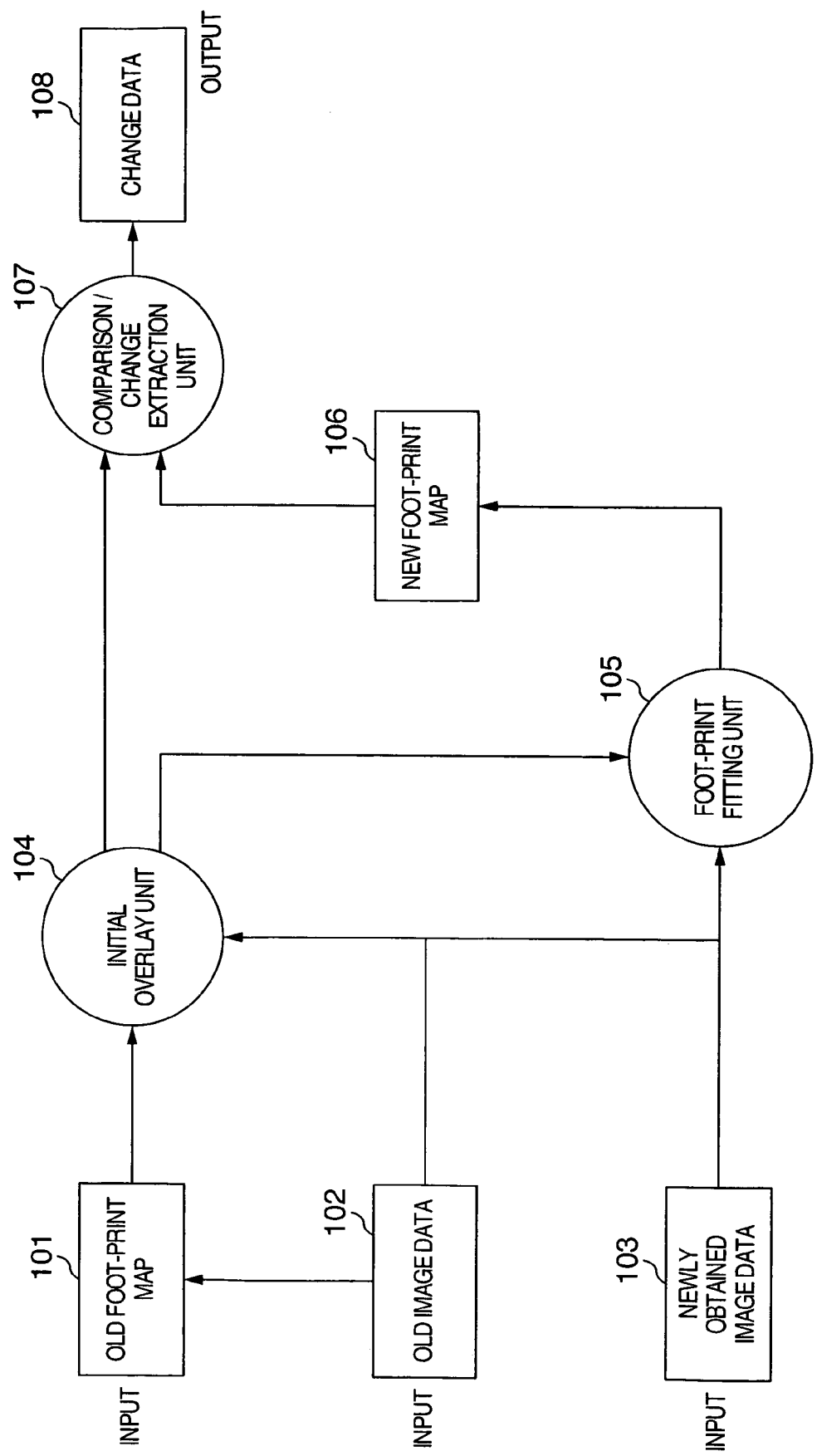

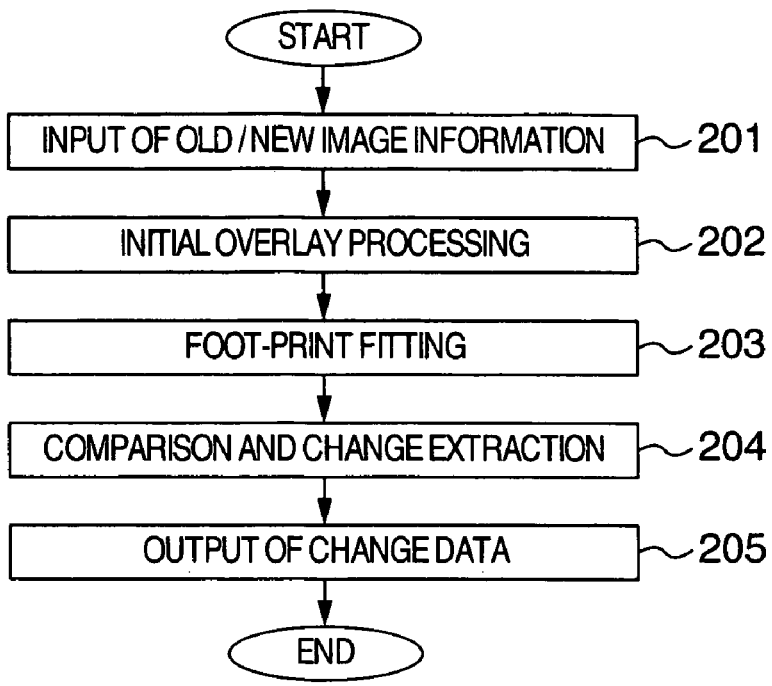
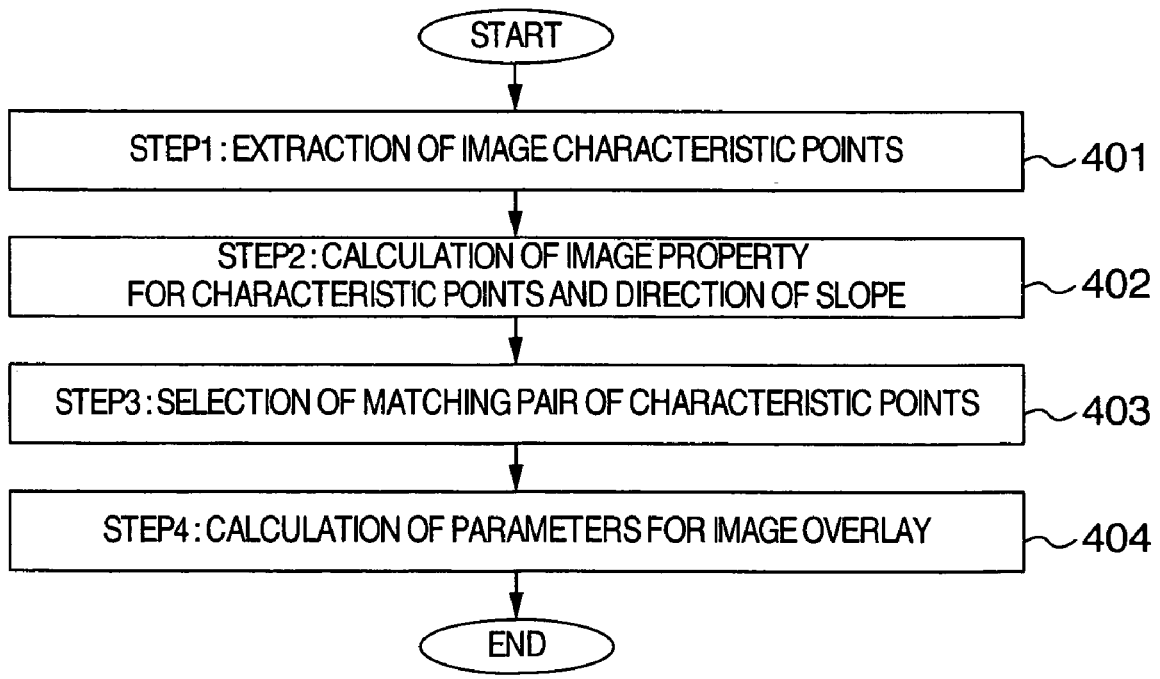

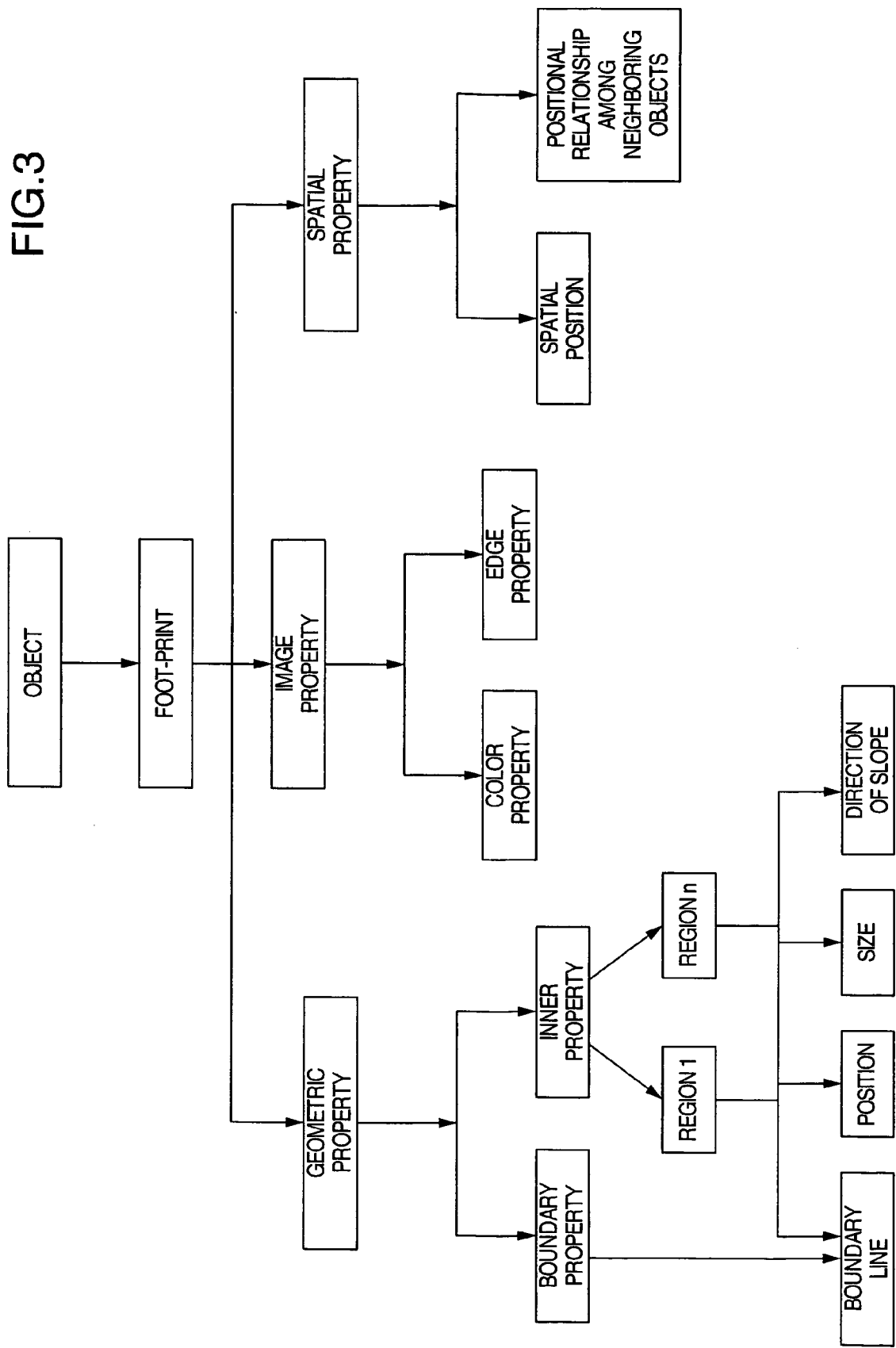

CHANGE DETECTION EQUIPMENT AND METHOD OF IMAGE RECOGNITION

INCORPORATION BY REFERENCE

The present application claims priority from Japanese application JP 2004-244545 filed on Aug. 25, 2004, the content of which is hereby incorporated by reference into this application.

BACKGROUND OF THE INVENTION

The present invention relates to a method and apparatus for detecting changes in an object from a plurality of images captured at a variety of camera positions, under a variety of lighting conditions, at a variety of angles and at a variety of scaling factors.

A method of detecting changes in an object from images taken in the space employs a still image which captures a region, and a plane value map or a solid value map. Specifically, one technique involves overlaying the map on the image to detect a new object from the image using a figure template (see, for example, JP-A-2000-310940), and another technique involves a comparison of a characteristic amount found from an input image with a characteristic amount found from a reference image to detect changes (see, for example, US 2002/0051572A1). This technique employs boundary information as a characteristic amount.

The prior art technique disclosed in JP-A-2000-310940 is incapable of detecting changes when an appropriate map does not exist. On the other hand, the prior art technique disclosed in US 2002/0051572A1 is incapable of determining a change using a plurality of properties including a geometric property, an image property, a relation property, and the like.

SUMMARY OF THE INVENTION

It is an object of the present invention to provide an object change detecting apparatus which is capable of detecting a change in an object by comparing object foot-prints which are comprised of object boundary properties, inner image properties, and positional relationship properties of objects that are generated not only from an orthorectified image but also from a plurality of images captured at different camera positions, under different lighting conditions, at different angles, and at different scaling factors.

Representative features of the present invention disclosed in the present application may be summarized as follows.

A method of extracting a change in an image includes creating a plurality of pieces of foot-print information of an object composed of a geometric property, an image property, and a spatial property from two or more captured images, and comparing the plurality of pieces of foot-print information with one another to output change data extracted by the comparison.

According to the present invention, relying on an initial alignment of a foot-print created from an old image based on extraction of characteristic points and matching with a new image, edge matching, and an area inclusion rate within a boundary shape, a search is made for an image area in the new image of an object corresponding to the old foot-print, and a searched position can be associatively modified utilizing the result of a search of surroundings. Also, for image areas of corresponding objects between the new and old images, an evaluation can be made on a change in the object based not only on matching of boundaries but also on a characteristic amount of a region configuration within the boundary of the object.

In this way, it is possible to readily realize the extraction of change information from new and old (aerial, satellite) images such as a monocular vision, an orthorectified image and the like.

Other objects, features and advantages of the invention will become apparent from the following description of the embodiments of the invention taken in conjunction with the accompanying drawings.

BRIEF DESCRIPTION OF THE DRAWINGS

FIG. 1 is a block diagram illustrating the configuration of a change detection processing apparatus according to one embodiment of the present invention;

FIG. 2 is a flow chart for describing change detection processing according to one embodiment;

FIG. 3 is a block diagram for explaining the configuration of a foot-print of an object according to one embodiment;

FIG. 4 is a flow chart illustrating initial overlay processing according to one embodiment;

DETAILED DESCRIPTION OF THE EMBODIMENTS

Figure 5:
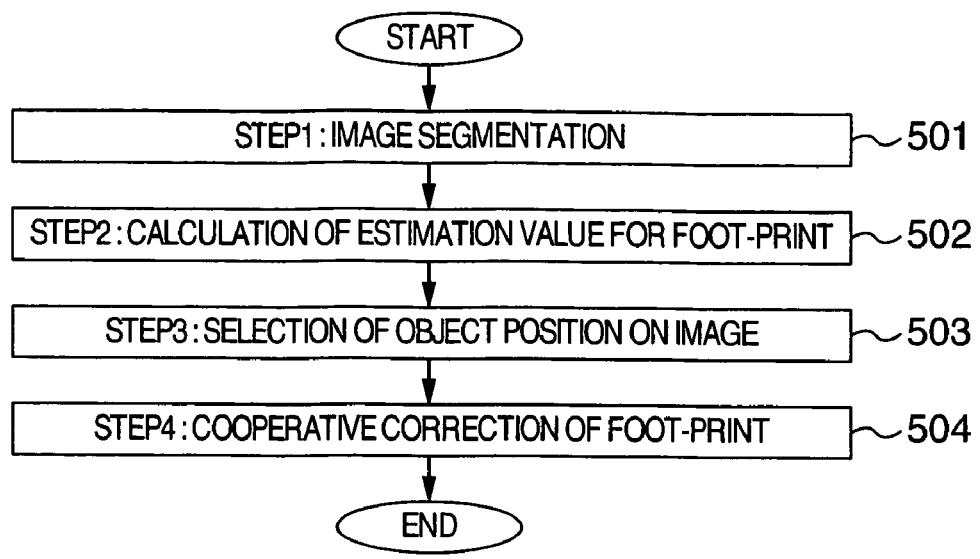
FIG. 5 is a flow chart illustrating foot-print fitting processing according to one embodiment.

In the following, embodiments of the present invention will be described with reference to the accompanying drawings. It should be noted that the embodiments described below may be implemented by a program read and executed by a computer, in hardware, or by cooperative processing of software and hardware.

FIG. 1 is a functional block diagram illustrating the configuration of a processing apparatus for object change detection processing based on matching of new and old images according to one embodiment of the present invention. The processing apparatus receives old image data 102, an old foot-print map 101 created from an old image, new image data 103, and the like. The processing apparatus comprises an initial overlay unit 101 for initially aligning a foot-print to a newly obtained image; a foot-print fitting unit 105 for searching for an image area in the newly obtained image of an object corresponding to the old foot-print map; and a comparison and change extraction unit 107 for comparing a new foot-print map 106 extracted from the newly obtained image with old foot-print information to extract change information. The processing apparatus delivers change data 108.

The new and old images 102, 103 are not limited to orthorectified images, but may be aerial photograph images or satellite images which differ in captured time, camera position, angle, scaling factor, and the like. In this embodiment, while the term "newly obtained image" is used, this image may be captured at the same time, as a matter of course.

First, foot-print information of an object will be defined. As illustrated in FIG. 3, the foot-print is composed of any of the following three properties, a geometric property, an image property, and a spatial property, or a combination of these properties. The geometric property includes boundary and internal regional information. An inner property includes at least one of information such as position, size, inclination direction for one or a plurality of regions. In addition, information on a boundary line for each region can be used for the inner information. The image property includes at least one of a color and an edge property. The spatial property includes information on the spatial position of an object or a positional relationship between neighboring objects. In the following description, object foot-print information created from an old image is called the "old foot-print map," while object foot-print information extracted from a newly obtained object is called the "new foot-print map."

The old foot-print map can be created by automatically. For example by analyzing features such as colors and textures around inputted point in a image, the system decides sample color for matching and searching range in the image. Then the system decides the building regions by judging the similarity of each pixel in the searching range with the sample color. Then it links extracted polygon lines of the building region's boundary and extracts a boundary shape of region as described in US 2004/0263514A1. Alternatively, a boundary shape of an object may be manually drawn to create the old foot-print map. The new foot-print map is automatically extracted from an object region on a newly obtained image produced by foot-print fitting for corresponding the old foot-print map to a newly obtained image. The new foot-print map is utilized as an old foot-print map in the next change detection.

The foot-print information may be created each time a change is detected, or the foot-print information stored for the old foot-print map may be repeatedly utilized. In the present invention, a change detection can be facilitated by use of the foot-print.

Next, description will be made on the functions of the respective components shown in FIG. 1. First, FIG. 2 illustrates the flow of change extraction processing based on a comparison of a newly obtained image with an old image.

First, new and old satellite images and foot-print information are inputted (step 201). Next, the initial overlay unit 104 extracts characteristic points from the old image to calculate parameters for alignment to the new image 103 through a comparison, later described in connection with FIG. 4. Then, the initial overlay unit 104 performs a geometric conversion using the calculated parameters such that the foot-print map 103 created from the old image 102 is in alignment to the position of the new image (step 202).

At step 203, the foot-print fitting unit 105 searches for an image area in the new image 103 of the object corresponding to the old foot-print map through an edge comparison and an area inclusion rate within a boundary shape.

The comparison and change extraction unit 107 further extracts change information by comparing new and old foot-print information composed of geometric, inner region and spatial information for corresponding objects between the new and old images (step 204), and outputs change data (step 205).

Next, the processing in the respective components will be described in greater detail. FIG. 4 illustrates the initial overlay processing at step 205 according to one embodiment. In the extraction of image characteristic points (step 401), the values of slopes are first calculated in the vertical and horizontal directions at each pixel in a pyramidal image space comprised of the same images at different resolutions, for example, a space comprised of images of the same region, at incrementally higher resolutions, which are virtually piled up, using an image processing operator such as a spatial first-order differential, second-order differential, and the like. The use of the pyramidal image permits a characteristic amount of the image to be built corresponding to images at different scaling factors. Next, the value of the slope at a pixel corresponding to the same position on the original image is found within the pyramidal image space, and the pixel position at which the value is larger than a predefined threshold, and at which the slope is most steep within neighboring images is defined as a representative image position (characteristic point). In this way, a pixel position which has a characteristic in the steepness of the slope within the image spaces at different resolutions can be selected as a representative characteristic point.

Next, the image property for the characteristic point and direction of slope are calculated (step 402). Specifically, the average value and variance value of the luminance are calculated within a window of a predefined size for each of pixels on the original image. Next, at least one of the luminance value of a pixel within the window, the average luminance value, and the variance value of the luminance is defined as an image property of the characteristic point. The calculation of the slope angle at the characteristic point first involves extracting an edge position at which the slope value is larger than a predefined threshold. Next, an edge point at which a difference in the slope angle between neighboring edge pixels is smaller than a predefined value is selected as a candidate position of a line point, and line information is found through a Hough Transform. Then, the line closest to the characteristic point is selected and defined as a slope angle at the characteristic point. If the length of the line is smaller than the threshold, this pixel is removed from the characteristic points such that the pixel is not defined as a characteristic point.

Next, a pair of characteristic points (pair of corresponding characteristic points) between the new and old images are selected (step 403). First, a similarity between the characteristic points of the new and old images is calculated. Specifically, for a certain characteristic point on the new image, the new image is rotated by a difference in the slope angle between the characteristic point on the new image and an arbitrary characteristic point on the old image to calculate the similarity (Euclid distance) by image characteristics at the characteristic point such as the luminance value, average luminance value, variance value of the luminance, and the like of a pixel within a window of a predefined size, centered on the position of the characteristic point. In this way, the characteristic point having the highest similarity from the characteristic point on the old image is found for the characteristic point on the new image. Further, if any of characteristic points on the new image has the highest similarity for the selected characteristic point on the old image, these two characteristic points are selected as a corresponding characteristic point pair between the new and old images.

Next, parameters are calculated for image overlay (step 404). Here, three parameters for alignment are calculated, including a rotating angle, a shift vector, a scaling factor, and the like for an alignment between the new and old images. For the calculation of the rotating angle, a difference in slope angle between the characteristic point pair selected as the corresponding characteristic pair is first calculated. Then, a histogram for an angle difference is created using the difference in slope angle between the corresponding characteristic point pairs. In this way, the angle difference having the highest histogram value is defined as the rotating angle for the alignment between the new and old images.

The calculation of a shift vector indicative of a moving direction and a distance for the alignment begins with a calculation of a shift vector between the characteristic point pair selected as the corresponding characteristic point pair. Next, the shift vector moving direction (angle) and an average value of the distance between all characteristic point matching pairs are calculated to find an average shift vector. Then, a corresponding characteristic point pair which has the same direction as the average shift vector, and has a shift distance smaller than a predefined threshold is selected, and an average shift vector is again found and is defined as a shift vector for the alignment between the new and old images.

In the calculation of a scaling factor, the characteristic points selected as the corresponding characteristic pairs are first divided into a characteristic point group belonging to the new image and a characteristic point group belonging to the old image. Next, the sum of distances between the characteristic points is calculated in each of the characteristic point groups. Then, the ratio of the sums of the distances is defined as a matching scaling factor between the new and old images.

The foot-print fitting 203 selects an image area in the new image corresponding to the old foot-print map. FIG. 5 illustrates the flow of overall foot-print fitting processing according to one embodiment.

First, the new image is segmented (step 501). In the image segmentation, the boundary information is utilized. Here, the boundary information is utilized as information which surrounds a region, and for distinguishing one region from another. In the following steps, highly accurate segmentation is performed using the boundary information thus extracted. The segmentation involves extraction of an image area which is positioned within the same boundary region and has a color difference smaller than a predefined threshold. Here, edge information is extracted by detecting an image position at which a slope value calculated by spatial first-order and second-order differentials is larger than a predefined threshold.

Next, an estimation value is calculated for foot-print (step 502). In neighboring image areas within the new image centered at a boundary shape of the old foot-print map, an image area corresponding to the old foot-print map is determined. This process is called "foot-print fitting."

$$M_{edge} = \frac{EP}{FL} \quad \text{Equation 1}$$

$$M_{area} = \frac{S_{footpring}^2}{S_{r_g} S_{footpring}} \quad \text{Equation 2}$$

The two equations above are used to calculate an overlay rate $M_{edge}$ of the edge information, and an area inclusion rate $M_{area}$. In Equation 1, FL represents the number of pixels of edge information within the region of the old foot-print map, and EP represents the number of edge pixels on the new image which overlay the edge information of the old foot-print map. In Equation 2, $S_{footprint}$ represents the area of the foot-print, $S_{rg}$ represents the area of an image area which is overlaid on the region of the foot-print.

Next, the image position of the object is selected (step 503). If there is an image position which has the edge information overlay rate (Equation 1) larger than a predefined threshold, and the highest region inclusion ratio (Equation 2), this image position is selected as the position of foot-print fitting. If there is no point which satisfies the foregoing conditions, the foot-print position on the old image is selected as the position of the foot-print fitting.

Next, the foot-print is cooperatively corrected (step 504). Based on the result of the foot-print fitting, the position of the foot-print fitting is corrected in a cooperative manner. First, the foot-print fitting position is searched from a predetermined range centered at the foot-print fitting position subjected to the cooperative correction. Next, an average amount of movements for fitting these foot-prints at appropriate positions on the image, and an average value of moving directions are found to calculate an average movement vector. Here, if differences between the moving distance and direction for fitting the foot-print subjected to the cooperative correction and the foregoing found average moving distance and direction fall within predefined thresholds, respectively, the correction may be omitted. If equal to or larger than the thresholds, and if the differences between the moving distance and direction for fitting the foot-print subjected to the cooperative correction and a moving distance and a direction for the closest foot-print fitting are smaller than predefined thresholds, the fitting moving vector of the closest object is defined as a fitting moving vector for the foot-print subjected to the cooperative correction. If equal to or more than the thresholds, an average fitting moving vector is selected.

Figure 6:
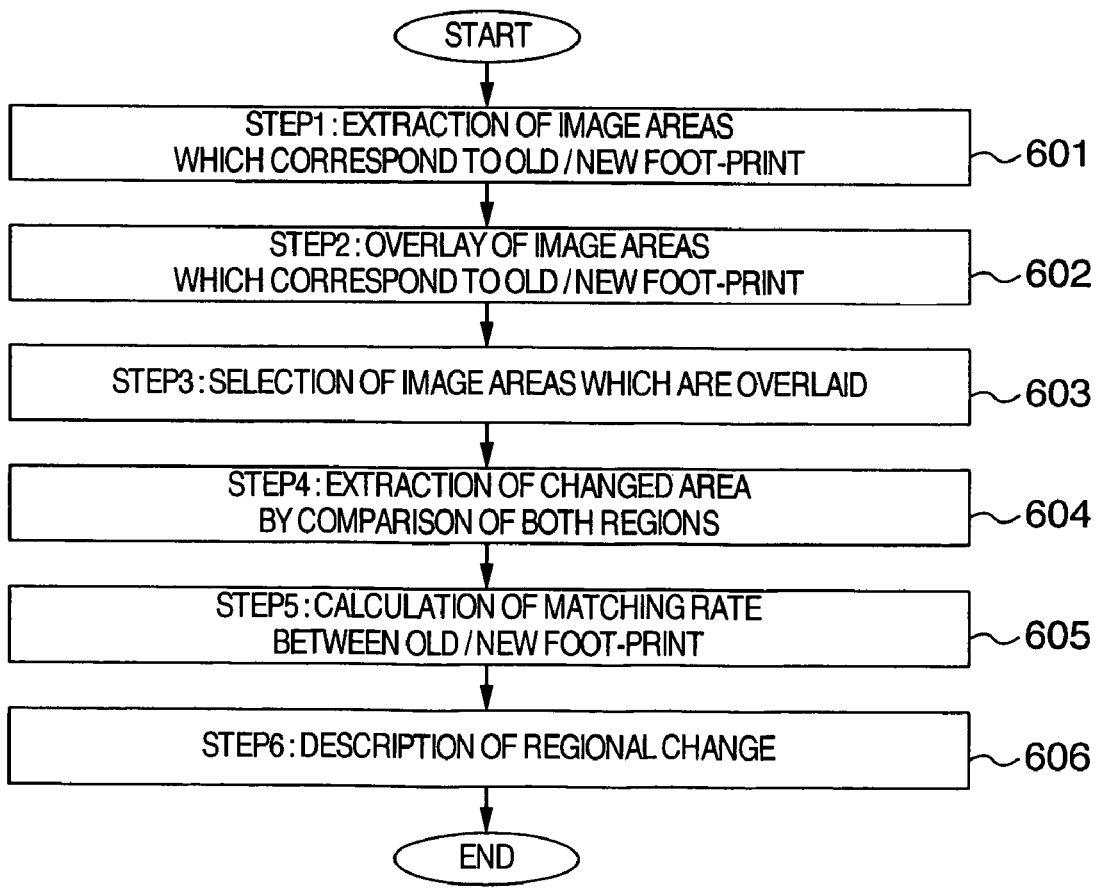
FIG. 6 is a flow chart illustrating comparison and change detection processing according to one embodiment.

The comparison and change extraction 204 involves extracting new foot-print information from an image position corresponding to the old foot-print in the new image, determined by the foot-print fitting, and extracting changes through a comparison between new and old foot-print information. FIG. 6 illustrates the flow of the foot-print fitting processing.

First, image areas are extracted from the new and old foot-print maps (step 601). In the image area extraction, a method described in connection with step 501 is utilized. An image area included in the boundary shape of the old foot-print map is extracted from the old image and defined as an image area of the old foot-print map, and an image area which overlays the boundary shape of the old foot-print map is extracted from a foot-print fitted image position on the new image, and defined as an image area of the new foot-print map.

Next, the image areas which correspond to the old/new foot-print are overlaid (step 602). Based on the position of the foot-print fitting, the image areas of the new and old foot-print maps are overlaid. At steps 603, 604, changes are extracted from each of image areas of the new foot-print map by the following processing.

First, overlaid image areas are selected (step 603). Areas of the old image overlaid on image areas of the new foot-print map are extracted.

Figure 7:
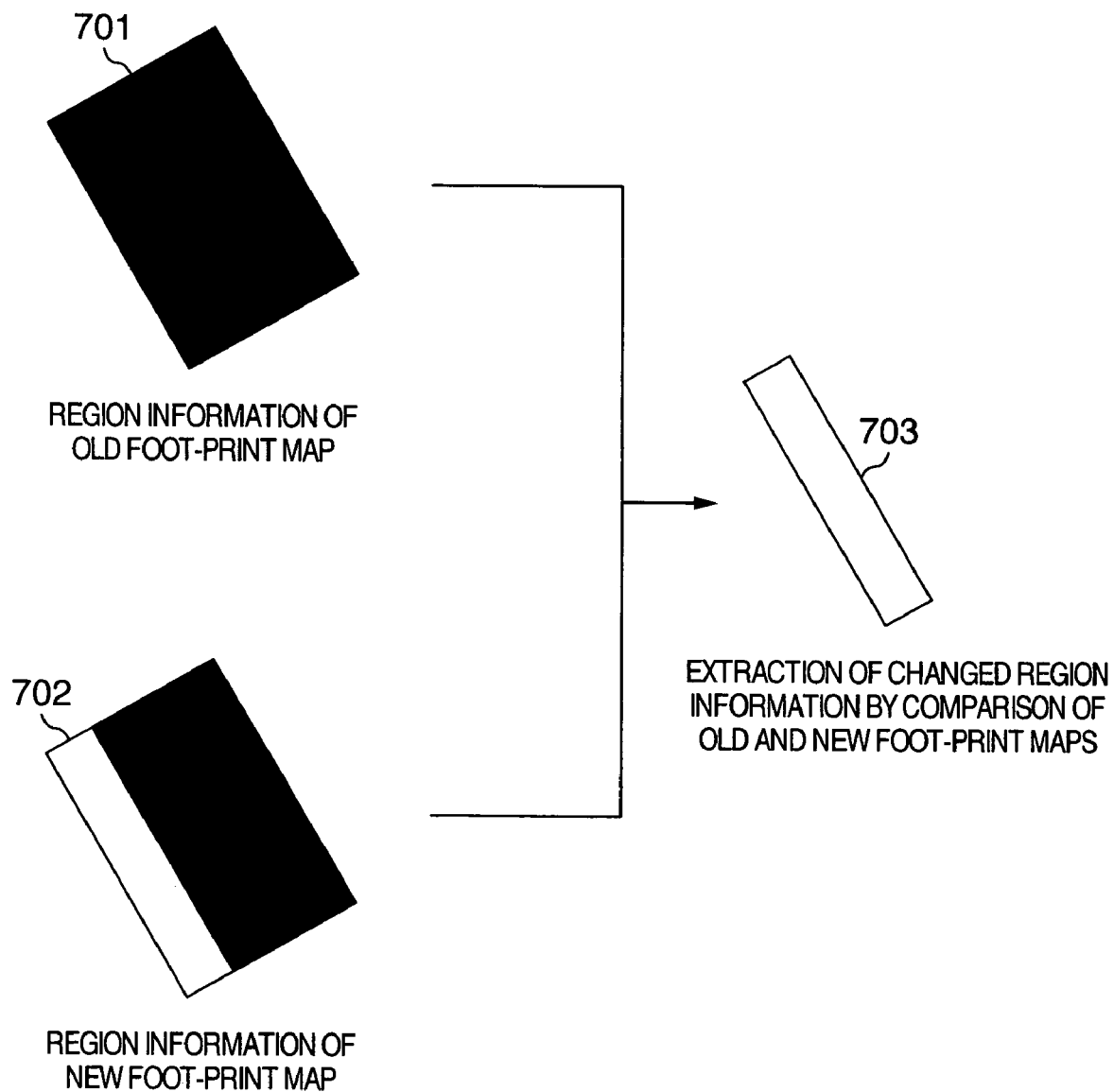
FIG. 7 is a diagram illustrating a changed region extraction according to one embodiment.

Next, a changed area is extracted through a comparison of both regions (step 604). The size of the new foot print region and the size of the region of the old foot-print map, found at step 2, are calculated for comparison. If a difference between both region sizes is larger than a predetermined threshold, the region is extracted as a changed area. If smaller, the region is defined as an existing region. FIG. 7 illustrates an example of an extracted changed area.

Next, a foot-print matching rate is calculated (step 605). As shown in Equation 3, the matching rate is calculated from comparisons of characteristics within the boundary region and boundary lines.

$$C(x) = \omega_p P(x) + \omega_e E(x) + \omega_s (1 - S(x)) \quad \text{Equation 3}$$

In Equation 3, a change evaluation function C(X) is calculated for the old foot-print x, where $\omega_p$, $\omega_e$, $\omega_s$ are weighting coefficients.

P(x), E(x), S(x) are calculated as shown in Equations 4 to 6:

$$P(x) = \frac{\text{Number of Lines Having Corresponding Lines}}{\text{Number of Lines in } x} \quad \text{Equation 4}$$

$$E(x) = \frac{\text{Length of Corresponding Line}}{\text{Length of Boundary Line of } x} \quad \text{Equation 5}$$

-continued $$S(x) = \frac{\text{Size of Changed Area}}{\text{Area Size of } x} \quad \text{Equation 6}$$

Equation 4 represents a function for calculating the ratio of a boundary line of the old foot-print x in which corresponding lines exist within the new image, and Equation 5 represents a function for calculating an overlay rate between the boundary line of the old foot-print x and lines extracted from corresponding image positions within the new image.

Next, the regional change is described (step 606). The change is evaluated by a description related to the change using the calculated evaluation value, for example, concepts such as "existing," "rebuild," "disappeared," and the like. A highly evaluated value is represented, for example, by a concept "existing"; a lowly evaluated value by "disappeared"; and an intermediately evaluated value by "rebuild."

Figure 8:
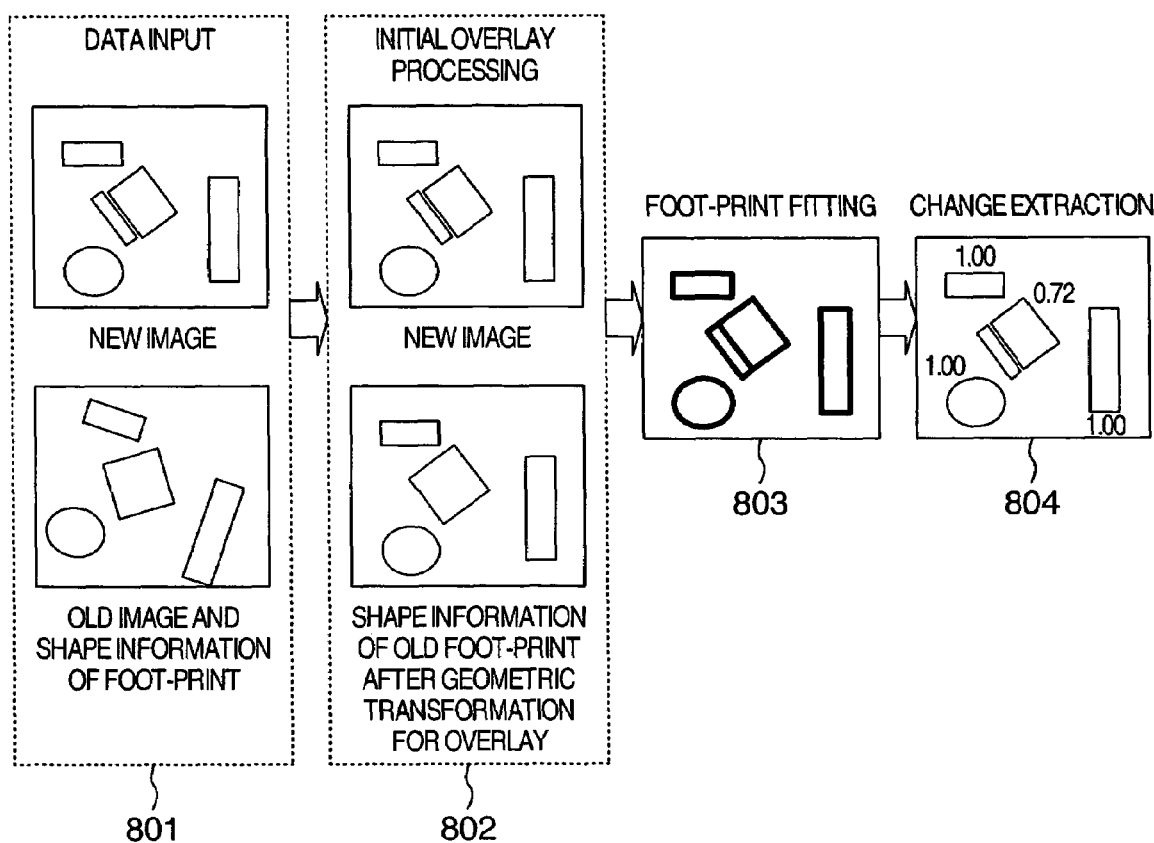
FIG. 8 is a flow diagram illustrating a change extraction according to one embodiment.

FIG. 8 illustrates the extraction of a change based on a comparison between the new and old (satellite photograph, aerial photograph) images according to one embodiment. First, the new and old images, an old foot-print map created from the old image are entered (801), and initial overlay is performed for initial alignment of the foot-print map created from the old image to the new image (802). Next, the foot-print fitting is performed for searching for an image area in the new image of an object corresponding to the old foot-print (803), and a foot-print matching value is calculated through a comparison of the new and old foot-prints to evaluate the change (804). The change is described by the calculated matching value, such as existing, rebuild, disappeared, and the like, and the changed region (shaded region in 804) is outputted.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A method of extracting and outputting differences between captured images, comprising the steps of:
   inputting a first captured image and a second captured image which differ in captured time;
   extracting first foot-print information from the first captured image, wherein the first foot-print information comprises (1) a geometric property which includes a boundary property and an internal regional property, (2) an image property which includes a color property, and (3) a spatial property of at least one object in the first captured image;
   overlaying the first captured image on the second captured image based on characteristic points extracted from the first captured image by performing a geometric conversion on the second captured image to match the characteristic points in the first and second captured images;
   extracting an image area from the second captured image corresponding to an image area in the first captured image, by using first foot-print information;
   extracting second foot-print information from the extracted image area of the second captured image; and
   comparing the first foot-print information with the second foot-print information to extract differences between the first and second foot-print information, and
   outputting the differences as change information, including an image of the change information.

2. A method of extracting and outputting differences between captured images according to claim 1, wherein said step of overlaying comprises calculating a similarity of a characteristic point extracted from the first captured image with a characteristic point extracted from the second captured image, and calculating a parameter for the overlay.

3. A method of extracting and outputting differences between captured images according to claim 1, wherein said step of extracting an image area is performed based on an overlay rate of edge information and an area inclusion rate.

4. A method of extracting and outputting differences between captured images according to claim 2, wherein said step of extracting an image area is performed based on an overlay rate of edge information and an area inclusion rate.

5. A method of extracting and outputting differences between captured images according to claim 1, wherein said step of extracting differences between the first and second foot-prints information is performed for the sizes of the first and second foot-print information, or for a characteristic amount within the first and second foot-print information.

6. A method of extracting and outputting differences between captured images according to claim 2, wherein said step of extracting differences between the first and second foot-print information is performed for the sizes of the first and second foot-print information, or for a characteristic amount within the foot-print information.

7. A method of extracting and outputting differences between captured images according to claim 3, wherein said step of extracting differences between the first and second foot-print information is performed for the sizes of the first and second foot-print information, or for a characteristic amount within the foot-print information.

8. A method of extracting and outputting differences between captured images according to claim 4, wherein said step of extracting differences between the first and second foot-print information is performed for the sizes of the first and second foot-print information, or for a characteristic amount within the foot-print information.

9. An apparatus for extracting and outputting differences between captured images, comprising:
   an input unit which inputs a first captured image and a second captured image which differ in captured time;
   an initial overlay processing unit for overlaying first foot-print information extracted from the first captured image on the second captured image, wherein the first foot-print information comprises (1) a geometric property which includes a boundary property and an internal regional property, (2) an image property which includes a color property, and (3) a spatial property of at least one object in the first captured image;
   a foot-print fitting unit for searching for an image area in the second captured image of an object corresponding to the first foot-print information; and
   a change extraction unit for comparing second foot-print information extracted from the searched image area with the first foot-print information to extract differences between the first and second foot-print information, and for outputting the differences as change information, including an image of the change information.

10. An apparatus for extracting and outputting differences between captured images according to claim 9, wherein said initial overlay processing unit performs a geometrical transformation of foot-print information of the second captured image using an alignment parameter of the first and second captured images.

11. An apparatus for extracting and outputting differences between captured images according to claim 9, wherein said foot-print fitting unit searches for the image area based on edge information and an area inclusion rate.

12. An apparatus for extracting and outputting differences between captured images according to claim 10, wherein said foot-print fitting unit searches for the image area based on edge information and an area inclusion rate.

13. An apparatus for extracting and outputting differences between captured images according to claim 9, wherein said change extraction unit compares the first and second foot-print information to extract a boundary and information of a region within the boundary.

14. An apparatus for extracting and outputting differences between captured images according to claim 10, wherein said change extraction unit compares the first and second foot-print information to extract a boundary and information of a region within the boundary.

15. An apparatus for extracting and outputting differences between captured images according to claim 11, wherein said change extraction unit compares the first and second foot-print information to extract a boundary and information of a region within the boundary.

16. An apparatus for extracting and outputting differences between captured images according to claim 12, wherein said change extraction unit compares the first and second foot-print information to extract a boundary and information of a region within the boundary.

17. A method of extracting a change in an image according to claim 1, wherein the change information further comprises a change description indicating which kind of change occurs in the object and a size change ratio of the object.

18. An apparatus for extracting and outputting differences between captured images according to claim 9, wherein the change information further comprises a change description indicating which kind of change occurs in the object and a size change ratio of the object.

19. A method of extracting and outputting differences between captured images according to claim 1,
wherein the internal regional property includes information of at least one of a position of a region, a size of a region, an inclination direction of a region, and a boundary line of a region,
wherein the image property further includes an edge property, and
wherein the spatial property further includes a positional relationship between the at least one object in the first captured image and at least one neighboring object.

20. An apparatus for extracting and outputting differences between captured images according to claim 9,
wherein the internal regional property includes information of at least one of a position of a region, a size of a region, an inclination direction of a region, and a boundary line of a region,
wherein the image property further includes an edge property, and
wherein the spatial property further includes a positional relationship between the at least one object in the first captured image and at least one neighboring object.

21. A method of extracting and outputting differences between captured images according to claim 1,
wherein the first captured image and the second captured image are respectively captured at different times, and
wherein the first captured image and the second captured image differ in at least one of camera position, camera angle, and scaling factor.

22. An apparatus for extracting and outputting differences between captured images according to claim 9,
wherein the first captured image and the second captured image are respectively captured at different times, and
wherein the first captured image and the second captured image differ in at least one of camera position, camera angle, and scaling factor.

* * * * *